(12) United States Patent
Eichler et al.

(10) Patent No.: US 9,551,390 B2
(45) Date of Patent: Jan. 24, 2017

(54) DISC BRAKE FOR A COMMERCIAL VEHICLE

(71) Applicant: KNORR-BREMSE Systeme fuer Nutzfahrzeuge GmbH, Munich (DE)

(72) Inventors: Thomas Eichler, Munich (DE); Paul Haberl-Guenthner, Aunkirchen (DE); Ralf Weber, Munich (DE); Igor Nesmjanowitsch, Hengersberg (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/495,126

(22) Filed: Sep. 24, 2014

(65) Prior Publication Data

US 2015/0008079 A1    Jan. 8, 2015

Related U.S. Application Data

(63) Continuation of application No. PCT/EP2013/055920, filed on Mar. 21, 2013.

(30) Foreign Application Priority Data

Mar. 26, 2012   (DE) .................. 10 2012 102 585

(51) Int. Cl.
*F16D 55/22* (2006.01)
*F16D 65/097* (2006.01)
(Continued)

(52) U.S. Cl.
CPC ......... *F16D 65/0972* (2013.01); *F16D 55/226* (2013.01); *F16D 65/02* (2013.01);
(Continued)

(58) Field of Classification Search
CPC ...... F16D 55/2255; F16D 55/26; F16D 55/31; F16D 55/226; F16D 65/18; F16D 65/54; F16D 65/0972; F16D 65/02; F16D 65/0979; F16D 2069/002; F16D 2055/0016; F16D 2055/0029
(Continued)

(56) References Cited

U.S. PATENT DOCUMENTS 3,134,459 A * 5/1964 Burnett ............... F16D 55/2255
                                                    188/196 P
3,473,631 A    10/1969 Schmid
(Continued)

FOREIGN PATENT DOCUMENTS

DE       1 205 853        11/1965
DE       19 48 567 U      10/1966
(Continued)

OTHER PUBLICATIONS

International Search Report (PCT/ISA/210) dated Jun. 5, 2013 with English translation (five pages).
(Continued)

*Primary Examiner* — Pamela Rodriguez
(74) *Attorney, Agent, or Firm* — Crowell & Moring LLP

(57) ABSTRACT

A disc brake for a commercial vehicle is provided. The disc brake includes a brake caliper which engages over a brake disc and is in the form of a sliding caliper, two brake pads which are arranged in the caliper, are movable in opposite directions and each have a pad carrier plate and a friction lining fastened thereon and of which an application-side brake pad is pressable against the brake disc by an application device via at least one brake plunger, and with at least one restoring device with which the brake caliper is returnable after a braking-induced displacement and release of the brake. The restoring device is provided with a friction element which is mounted in the brake pad so as to be displaceable to a limited extent under pressure loading in the
(Continued)

axial direction of the brake disc and on which an elastic pressure element held in the brake caliper and/or brake plunger acts.

16 Claims, 3 Drawing Sheets

(51) Int. Cl.
*F16D 65/02* (2006.01)
*F16D 55/226* (2006.01)
*F16D 69/00* (2006.01)
*F16D 55/00* (2006.01)

(52) U.S. Cl.
CPC .. *F16D 65/0979* (2013.01); *F16D 2055/0016* (2013.01); *F16D 2055/0029* (2013.01); *F16D 2069/002* (2013.01)

(58) Field of Classification Search
USPC ............... 188/72.3, 71.7, 71.8, 73.1, 196 F, 196 R, 188/196 P
See application file for complete search history.

(56) References Cited

U.S. PATENT DOCUMENTS

| | | | | |
|---|---|---|---|---|
| 3,534,835 | A | * | 10/1970 | Meier .................... F16D 65/18 188/196 F |
| 3,570,631 | A | * | 3/1971 | Schaftner ................ F16D 65/54 188/196 P |
| 4,508,196 | A | | 4/1985 | Janon |
| 4,641,519 | A | | 2/1987 | Klein et al. |
| 6,755,286 | B2 | | 6/2004 | Wirth |
| 2010/0000828 | A1 | | 1/2010 | Pericevic et al. |
| 2011/0094834 | A1 | | 4/2011 | Burgoon et al. |
| 2011/0147138 | A1 | * | 6/2011 | Jungmann ............... F16D 65/18 188/71.7 |
| 2013/0062149 | A1 | * | 3/2013 | Burgoon ............... B60T 13/741 188/72.3 |

FOREIGN PATENT DOCUMENTS

| | | |
|---|---|---|
| DE | 24 36 541 A1 | 2/1976 |
| DE | 43 18 746 A1 | 12/1994 |
| DE | 296 15 283 U1 | 11/1996 |
| DE | 199 46 677 A1 | 5/2001 |
| DE | 100 55 796 A1 | 5/2002 |
| DE | 10 2007 001 213 A1 | 7/2008 |
| GB | 1089955 | 11/1967 |
| WO | WO 03/027526 A1 | 4/2003 |

OTHER PUBLICATIONS

German Office Action dated Jan. 9, 2013 (eight (8) pages).
International Preliminary Report on Patentability (PCT/IB/326 & PCT/IB/373) dated Oct. 9, 2014, including English translation of Written Opinion (PCT/ISA/237) (six (6) pages).
Opposition document dated May 27, 2015, issued in priority application DE 10 2012 102 585.1 (non-English language), three (3) pages, and English-language machine translation, two (2) pages.
Technik Recht correspondence dated Apr. 1, 2015, issued in priority application DE 10 2012 102 585 (non-English language), five (5) pages, and English-language machine translation, five (5) pages.

* cited by examiner

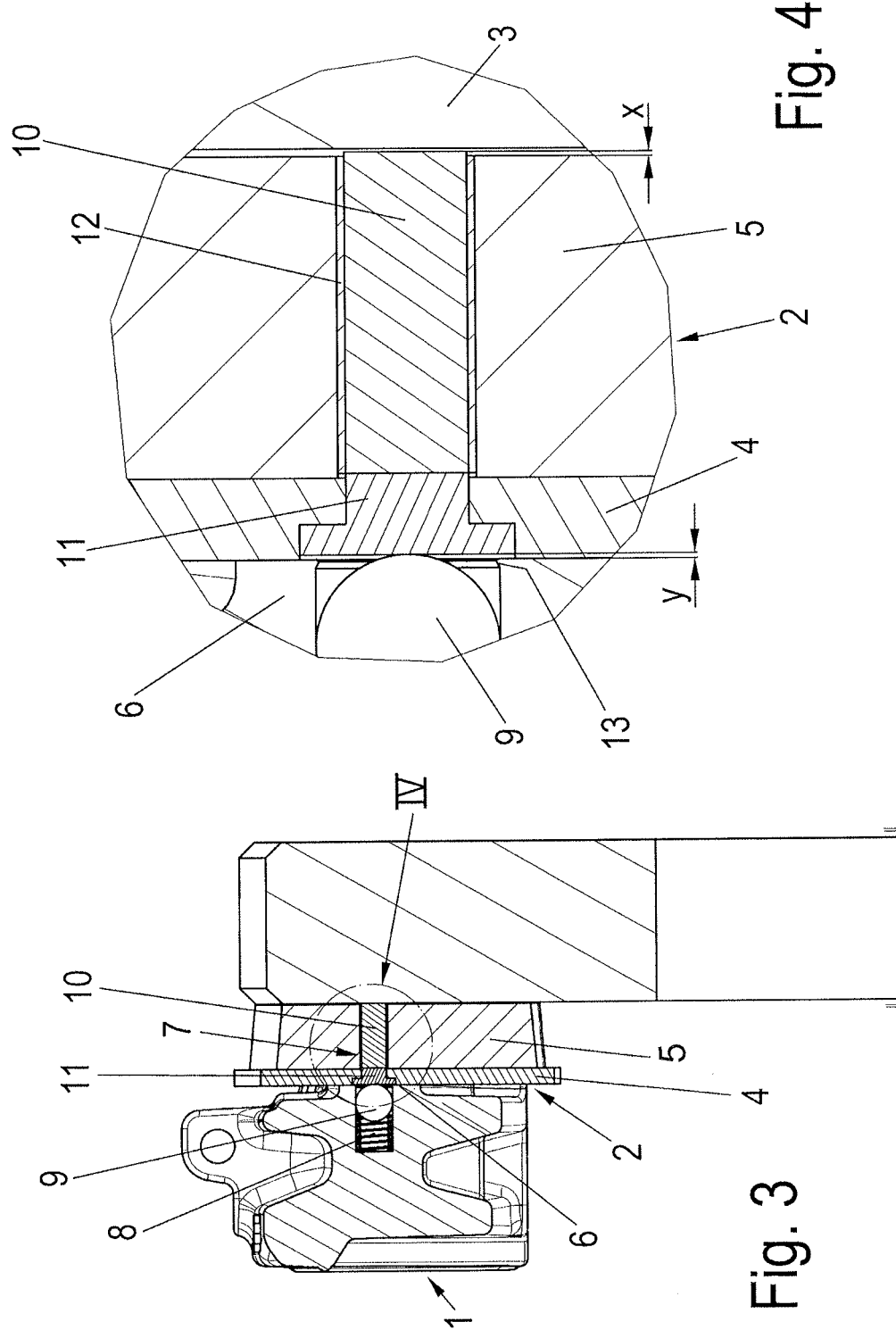

DISC BRAKE FOR A COMMERCIAL VEHICLE

CROSS REFERENCE TO RELATED APPLICATIONS

This application is a continuation of PCT International Application No. PCT/EP2013/055920, filed Mar. 21, 2013, which claims priority under 35 U.S.C. §119 from German Patent Application No. 10 2012 102 585.1, filed Mar. 26, 2012, the entire disclosures of which are herein expressly incorporated by reference.

BACKGROUND AND SUMMARY OF THE INVENTION

The invention relates to a disc brake for a commercial vehicle having a brake caliper which straddles a brake disc and is configured as a sliding caliper, two brake pads which are arranged therein, can be moved in opposite directions and in each case have a pad carrier plate and a friction lining fastened thereon, of which an application-side friction lining can be pressed against the brake disc by way of a brake application device via at least one brake ram, and having at least one restoring device, by which the caliper can be returned after a braking-induced displacement and release of the brake.

In the functional case, that is to say in the case of a brake operation, an application of the brake pads by means of a brake application device takes place first of all by pressing of the application-side brake pad against the brake disc and subsequent pressing of the reaction-side brake pad which lies on the opposite side of the brake disc.

Whereas the application-side brake pad is pressed against the brake disc via brake rams of the brake application device, the brake caliper which is configured as a sliding caliper, is displaced counter to the pressing action of the brake application device on the application-side brake pad in order to press the reaction-side brake pad against the other side of the brake disc.

After the brake is released, the brake caliper remains in its last-mentioned position in the case of the known disc brake, in which position the brake pads, but at least the reaction-side brake pad, bear/bears, admittedly in a pressureless manner but in a grinding manner, against the brake disc. What are known as the residual wear torques which occur during driving operation as a result lead to an increased fuel consumption of the vehicle and also to a reduction of the service life both of the brake disc and of the brake pads.

A slight release of the brake pads takes place during driving operation by a wobbling of the brake disc and by way of vibrations and transverse accelerations when driving around bends. However, these effects are not sufficient to effectively prevent the grinding.

In order to avoid these disadvantages, DE 199 46 677 A1 has disclosed a disc brake having a restoring device which, after the release of the brake, returns the brake caliper into its starting position. In order, in particular, to guide the reaction-side brake pad in the non-functional position out of its contact with the brake disc, spring systems are known which are prestressed during application of the brake. After release, the brake pads are pressed back or pulled away by way of the spring energy which is stored as a result of the prestress. Here, said spring systems can be anchored in stationary components, for example, a brake carrier.

However, the restoring of the caliper is exclusively dependent on the spring travel of the restoring element, which, however, does not make possible an exact guidance back to an always identical air play dimension between the brake disc and the reaction-side brake pad. This has the result that the known disc brake represents a rather unsatisfactory solution to the problem.

This also applies when the reaction-side brake pad is attached in a positively locking manner to the brake caliper back, since, as a result of the holding forces which remain in the entire system of components which move relative to one another after release of the brake, said components have to be pressed away from the brake disc.

The invention is therefore based on the object of developing a disc brake of the generic type in such a way that a restoring of the brake caliper that remains constant in relation to the air play is ensured, and residual wear torques which occur are minimized.

This and other objects are achieved by way of a disc brake for a commercial vehicle having a brake caliper which straddles a brake disc and is configured as a sliding caliper, two brake pads which are arranged therein, can be moved in opposite directions and in each case have a pad carrier plate and a friction lining fastened thereon, of which an application-side friction lining can be pressed against the brake disc by way of a brake application device via at least one brake ram, and having at least one restoring device, by which the caliper can be returned after a braking-induced displacement and release of the brake. The restoring device is provided with a friction element which is mounted in the brake pad such that it can be displaced to a limited extent in a pressure-loaded manner in the axial direction of the brake disc. On the friction element, an elastic pressure element acts, which is held in the brake caliper and/or brake ram.

The invention is used especially in the reaction-side area of the disc brake, but can certainly also be used in the application-side area, to be precise in the reaction-side brake pad/brake ram functional unit there. In any case, a reduction in the residual wear torque is achieved by way of the invention.

According to the invention, a friction element is provided in the brake pad, to be precise in the friction lining of the brake pad, which friction element is held such that it can be displaced to a limited extent in a pressure-loaded manner in the axial direction of the brake disc. The friction element is composed of the same material as, or a more wear-resistant material than, the friction lining itself. For axial movability of the friction element in an impediment-free manner, it is mounted, for example, in a sliding sleeve which can be composed of metal or ceramic and is connected fixedly to the friction lining or the pad carrier plate.

A plunger, which is held in an axially displaceable manner in the pad carrier plate with the friction element, is provided as a further constituent part of the restoring device. The plunger is firstly connected fixedly to the friction element and is secondly in correspondence with an elastic pressure element which is held in the brake caliper and preferably consists of a compression spring in the form of disc springs, leaf springs or helical springs. However, it is also contemplated to use a pressurized cartridge as the elastic pressure element, the medium of which pressurized cartridge is compressed during brake application with the build-up of pressure and is relieved during the release of the brake application.

The pressure element can act directly on the plunger, but can also act via an intermediate element, preferably a ball which is positioned and held such that it secures the pressure element axially in the brake caliper spine and presses the plunger against the limiting means in the pad back plate. The limiting means is fixed, for example, to 0.3 mm and therefore corresponds to slightly less than half the desired air play. The friction element rubs with a slightly smaller projection beyond the friction lining; said projection is to be smaller than half of the stated theoretical air play, for example 0.3 mm.

A plurality of, in particular two, friction elements which are arranged at a spacing from one another are preferably provided, which are pressed onto the brake disc during the application of the brakes and are positioned in a planar manner with the friction lining surface, the pressure element being tensioned by way of the relative axial displacement of the friction elements and the brake caliper, including the brake pad.

During the release of the brake application, the respective friction element continues to be pressed against the brake disc via the plunger as a result of the spring force which is stored. The restoring force of the spring causes the displaceably mounted brake caliper and the displaceably mounted brake pad to be pushed away from the brake disc. The brake pad, that is to say the reaction-side brake pad here, is ideally connected to the brake caliper back in a positively locking manner.

Although a small residual wear torque with little required frictional energy is maintained, this is insignificantly small, since the friction elements bear with very small contact areas against the brake disc. An equilibrium which is free from residual wear or is approximately free therefrom is produced a short time after the braking operation. In any case, the pressing force which remains is small enough that the problems which are described with respect to the prior art no longer occur.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a cross-section view through the disc brake according to the line III-III in FIG. 1; and FIG. 4 shows an enlarged detail according to the indication IV in FIG. 3.

DETAILED DESCRIPTION OF THE DRAWINGS

Figure 1:
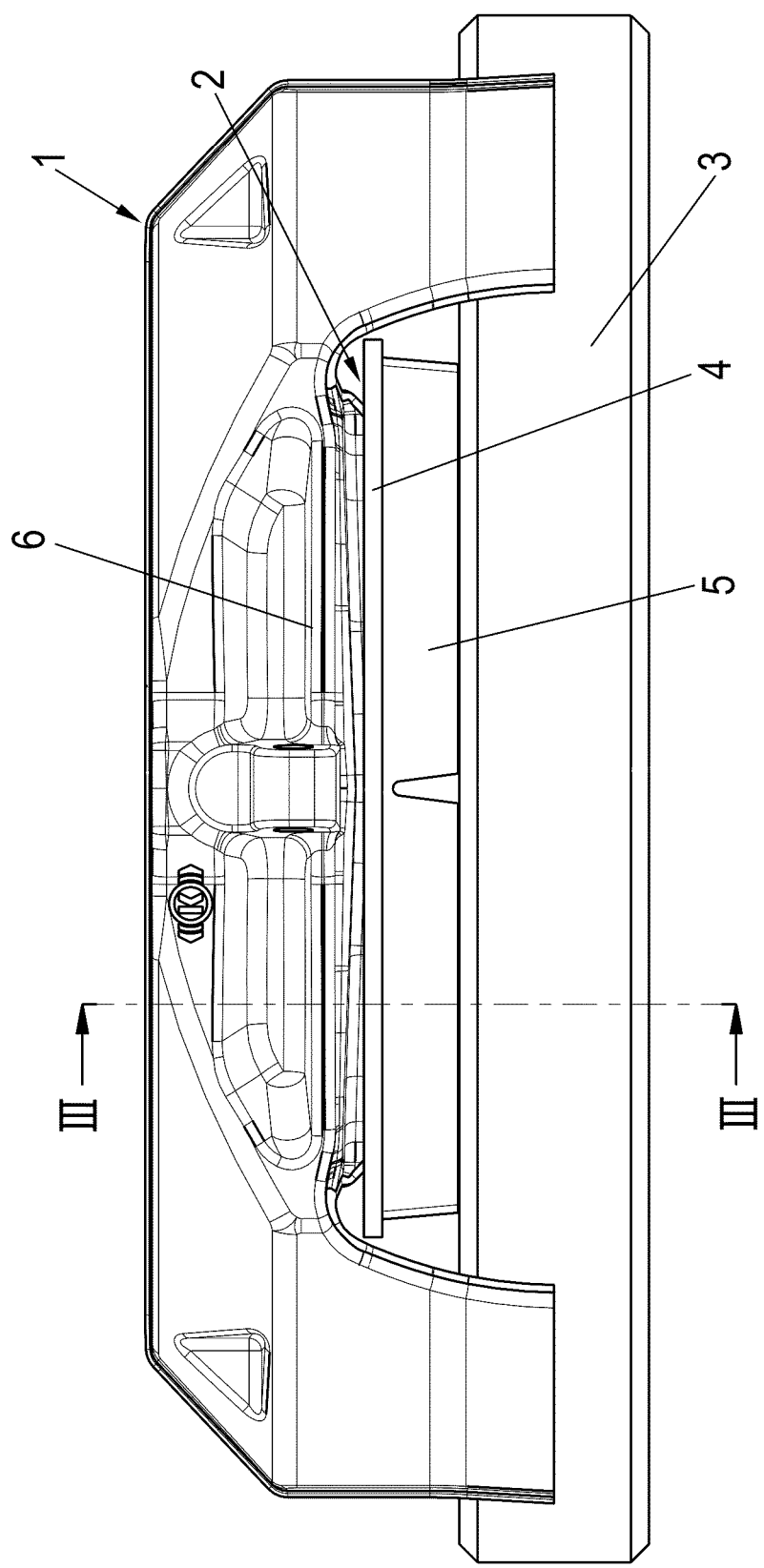
FIG. 1 is a plan view diagram of a part of a disc brake according to an embodiment of the invention.

The figures show a caliper back 6 of a brake caliper 1 of a disc brake, into which brake caliper back 6 a brake pad 2 is inserted. The brake pad 2 consists of a pad carrier plate 4 and a friction lining 5 which is fastened thereon and faces a brake disc 3. The brake pad 2 is pressed onto the brake disc 3 with its friction lining side in the case of a braking operation. To this end, the brake caliper back 6 bears against the pad carrier plate 2.

As illustrated very clearly in FIG. 3, a restoring device 7 is provided to restore the brake caliper 1 after the release of the brake. The restoring device 7 has a friction element 10 which is held in the brake pad 2 such that it can be displaced to a limited extent in a pressure-loaded manner in the axial direction of the brake disc 3. The friction element 10 is under the pressure of an elastic pressure element 8, in the example here in the form of a helical spring. The friction element 10 is mounted displaceably in a sliding sleeve 12, which is composed of metal or ceramic and is connected fixedly to the friction lining 5, or to the pad carrier plate 4 (in another embodiment).

Figure 2:
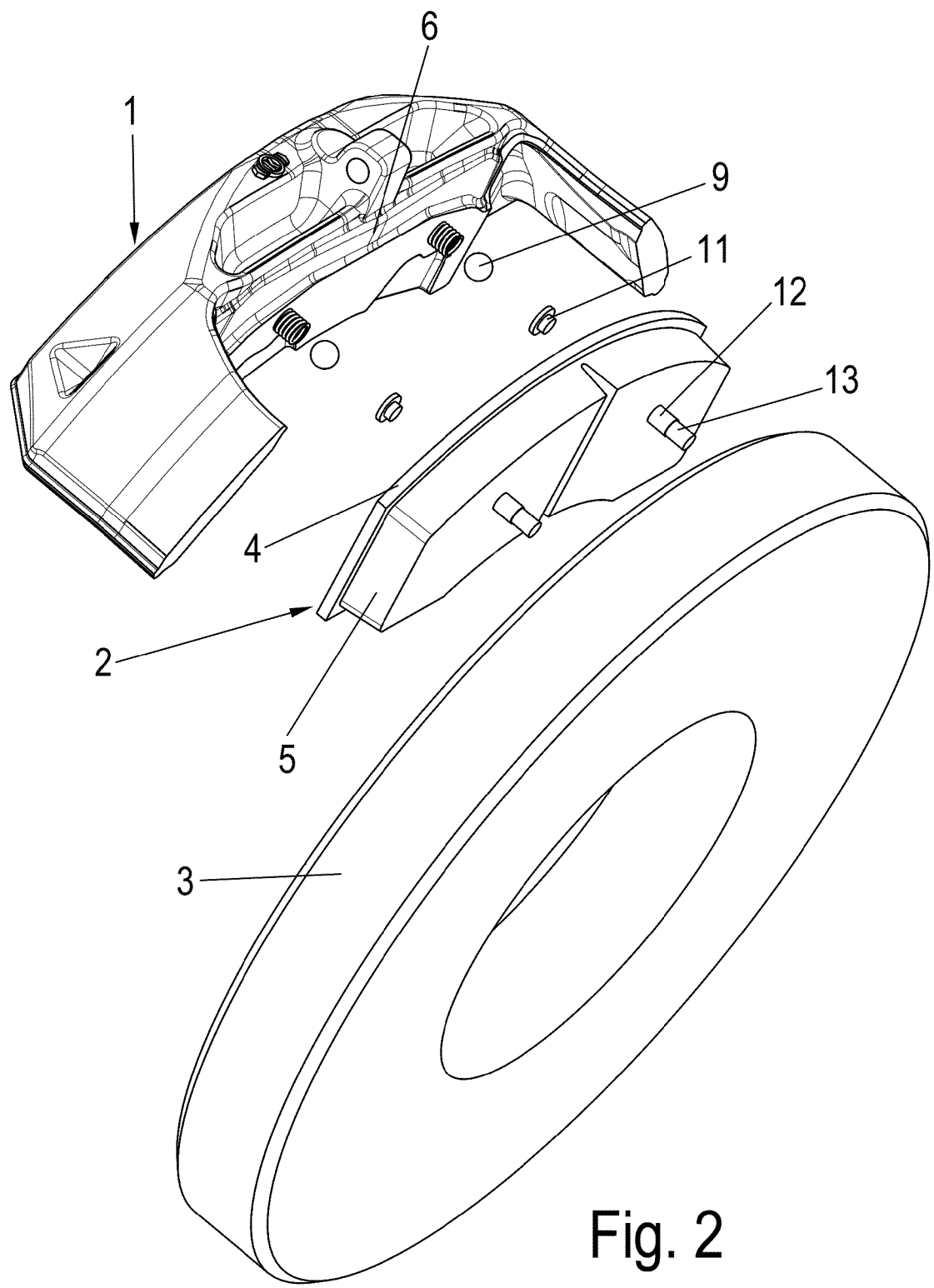
FIG. 2 is an exploded illustration of the part of FIG. 1.

It can be seen in FIG. 2 that two restoring devices 7 are provided, which are arranged spaced apart from one another. For the sake of simplicity, merely one restoring device 7 is described in the following text, the second restoring device being of identical construction.

The displacement of the friction element 10 takes place by way of a plunger 11. The plunger 11 is likewise held in an axially movable manner in a receptacle of the pad carrier plate 4 and is, therefore, connected fixedly, for example by way of adhesive bonding or pressing, on an associated end side of the friction element 10.

A ball 9 is positioned between the plunger 11 and the elastic pressure element 8 in a manner which is likewise mounted in the brake caliper back 6. The ball 9 is supported firstly on the plunger 11 and secondly on the pressure element 8. The bell 9 forms a travel limit for the pressure element 8, to which end the recess, in which the ball 9 lies, has a reduced portion 13, for example by way of calking, on the side which faces the plunger 11.

FIG. 4 shows the brake pad 2 in a non-functional position, that is to say in an unbraked position. Here, the friction element 10 protrudes beyond the friction lining 5, a projection (X), for example 0.3 mm, being smaller than or equal to the spacing (Y) of that supporting face of the plunger 11 which makes contact with the ball 9 from the bearing face of the pad carrier plate 4 on the brake caliper back 6. This spacing is slightly smaller than half the theoretical air play and is, for example, 0.3 mm. The spacing of 0.3 mm is defined by the height of the plunger 11 and the depth of the receptacle in the pad carrier plate 4, the ball 9 serving to secure the pressure element 8.

During mounting of the brake pad 2, the pressure element 8 is prestressed additionally. In the case of a brake pad 2 which is connected fixedly to the brake caliper back 6, for example by way of a screw connection, the projection is substantially greater than the defined travel of the plunger 11, of 0.3 mm as stated.

If, in contrast, the brake pad 2 is not held on the brake caliper 1, the projection of the ball 9 must not be greater than the defined plunger travel, since otherwise the brake pad would be pressed via the plunger 11 in the direction of the brake disc.

When the brake application force is released, the stored spring energy continues to press the friction element 10 against the brake disc 3 via the plunger 11. The restoring force of the pressure element 8 ensures that the displaceably mounted brake caliper 1 and the displaceably mounted brake pad 2 are pushed away from the brake disc 3.

LIST OF DESIGNATIONS

1 Brake caliper
2 Brake pad
3 Brake disc
4 Pad carrier plate
5 Friction lining
6 Brake caliper back
7 Restoring device
8 Pressure element
9 Ball
10 Friction element
11 Plunger
12 Sliding sleeve
13 Reduced portion The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a commercial vehicle, comprising:
a caliper which, in use, straddles a brake disc, the caliper being configured as a sliding caliper;
two brake pads arranged in the caliper, the brake pads being movable in opposite directions and, in each case, comprising a lining carrier plate and a friction lining fastened thereon, wherein one brake pad is an application-side brake pad pressable against the brake disc via a brake application device and the other is a reaction-side brake pad; and
a restoring device by which the caliper is returned after a braking-induced displacement and release of the disc brake, wherein the restoring device comprises a friction element mounted in the reaction-side or application side brake pad so as to be displaceable to a limited extent in a pressure-loaded manner in an axial direction of the brake disc, the restoring element further having an elastic pressure element that acts on the friction element, the elastic pressure element being held in the caliper for the reaction-side brake pad or in a brake ram of the brake application device for the application side brake pad, wherein
the friction element mounted in the reaction-side or application side brake pad is pressed against the brake disc, and
when a brake application force is released, a restoring force of the elastic pressure element displaces the caliper and the brake pads away from the brake disc.

2. The disc brake according to claim 1, wherein the friction element is composed of a same material as, or a harder material than, the material of the friction lining.

3. The disc brake according to claim 2, wherein the friction element is mounted in a sliding sleeve, the sliding sleeve being composed of metal or ceramic and being connected to the friction lining or the lining carrier plate of the brake pad.

4. The disc brake according to claim 1, wherein the friction element is mounted in a sliding sleeve, the sliding sleeve being composed of metal or ceramic and being connected to the friction lining or the lining carrier plate of the brake pad.

5. The disc brake according to claim 4, wherein the restoring element further comprises a plunger connected to the friction element, the plunger being held axially displaceably in a receptacle of the lining carrier plate of the brake pad.

6. The disc brake according to claim 5, wherein, in a non-functional position of the disc brake, the friction element projects beyond a surface of the friction lining of the brake pad in a direction of the brake disc, and further wherein the plunger lies in the lining carrier plate at a spacing from a bearing face of the lining carrier plate with respect to the caliper.

7. The disc brake according to claim 6, wherein the amount of the projection of the friction element beyond the friction lining is less than or equal to the spacing of the plunger from the bearing face of the lining carrier plate.

8. The disc brake according to claim 7, wherein the elastic pressure element bears against a side of the plunger facing away from the friction element.

9. The disc brake according to claim 5, wherein the elastic pressure element bears against a side of the plunger facing away from the friction element.

10. The disc brake according to claim 6, wherein the projection of the friction element beyond the friction lining in the direction of the brake disc and the spacing of the plunger from the bearing face of the lining carrier plate are less than half a structural air play for the disc brake.

11. The disc brake according to claim 7, wherein the elastic pressure element bears against a side of the plunger facing away from the friction element via an intermediate ball.

12. The disc brake according to claim 5, wherein the elastic pressure element bears against a side of the plunger facing away from the friction element via an intermediate ball.

13. The disc brake according to claim 12, wherein a restoring travel of the pressure element is delimited by a reduced portion of a receptacle in which are arranged the elastic pressure element and the ball.

14. The disc brake according to claim 1, wherein the restoring element further comprises a plunger connected to the friction element, the plunger being held axially displaceably in a receptacle of the lining carrier plate of the brake pad.

15. The disc brake according to claim 1, wherein the elastic pressure element comprises a compression spring or a pressurized cartridge filled with a compressible medium.

16. The disc brake according to claim 1, wherein the elastic pressure element comprises a helical spring, a disc spring or a leaf spring.

* * * * *